United States Patent [19]

Wu

[11] Patent Number: 4,974,124

[45] Date of Patent: Nov. 27, 1990

[54] LIGHT DEVICE FOR A BICYCLE

[76] Inventor: Ta-Hsiung Wu, No. 172-5, Sec. 3, San-Ming Rd., Taoyuan City, Taiwan

[21] Appl. No.: 533,386

[22] Filed: Jun. 5, 1990

[51] Int. Cl.⁵ .............................................. B62J 6/08
[52] U.S. Cl. ...................................... 362/72; 362/193
[58] Field of Search ................ 362/72, 192, 193, 396; 310/67 A, 67 R, 152

[56] References Cited

U.S. PATENT DOCUMENTS

| | | | |
|---|---|---|---|
| 598,198 | 2/1898 | Dowd | 362/72 |
| 731,722 | 6/1955 | Mewburn et al. | 362/72 |
| 4,204,191 | 5/1980 | Daniels | 362/72 |
| 4,761,577 | 8/1988 | Thomas et al. | 310/67 A |
| 4,860,176 | 8/1989 | Bauwens et al. | 362/72 |

FOREIGN PATENT DOCUMENTS

| | | | |
|---|---|---|---|
| 325243 | 9/1920 | Fed. Rep. of Germany | 362/72 |
| 548575 | 1/1922 | France | 362/193 |
| 541060 | 7/1922 | France | 362/72 |
| 882887 | 3/1943 | France | 362/72 |
| 1047700 | 12/1953 | France | 310/152 |
| 379806 | 4/1940 | Italy | 362/72 |
| 409729 | 3/1945 | Italy | 362/72 |
| 416982 | 12/1946 | Italy | 362/193 |
| 168319 | 6/1934 | Switzerland | 362/72 |
| 268068 | 7/1950 | Switzerland | 362/193 |

*Primary Examiner*—Ira S. Lazarus
*Assistant Examiner*—Y. Quach
*Attorney, Agent, or Firm*—Kenyon & Kenyon

[57] ABSTRACT

A light device for a bicycle includes a hollow main casing to be attached to a handlebar stem of the bicycle, a first magnet member, a second magnet member having a polarity opposite the first magnet member, a coil member disposed between the first and second magnet members, and a rotary magnet piece disposed adjacent to the first and second magnet members. The first and second magnet members, the coil member and the rotary magnet member are arranged inside the main casing. The rotary magnet member rotates with the front wheel of the bicycle. A light casing is attached to a front open end of the main casing. A light bulb is disposed inside the light casing and is electrically connected to the coil member. The rotation of the rotary magent piece induces electric current in the coil member which powers the light bulb.

4 Claims, 6 Drawing Sheets

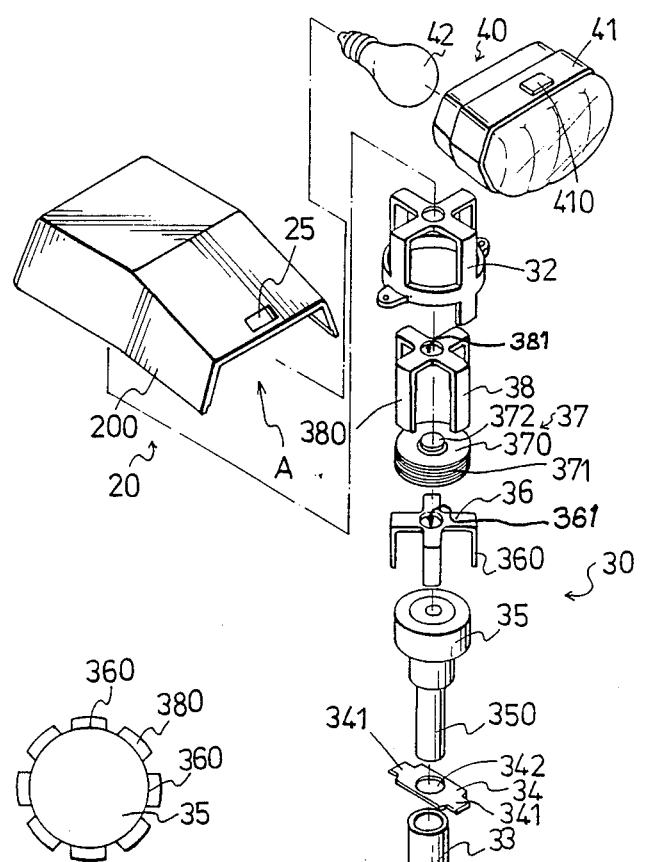
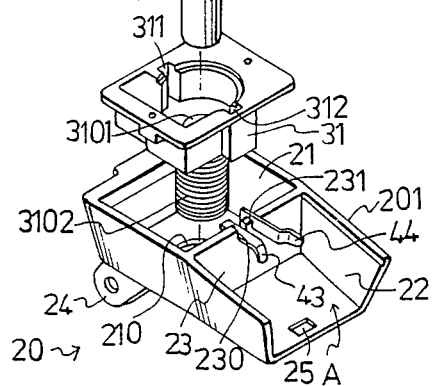
FIG. 2A
FIG. 2

LIGHT DEVICE FOR A BICYCLE

BACKGROUND OF THE INVENTION

The invention relates to a light device for a bicycle, more particularly to a light device which is powered by the rotation of the front wheel of the bicycle.

A bicycle using a conventional light device is shown in FIG. 1. A substantially bottle-shaped friction wheel 11 is mounted to one of the rear forks 10 of the bicycle and is in contact with the rim edge of the rear wheel 12. A conducting wire 13 is wrapped around the body of the bicycle and electrically connects the friction wheel 11 to a light means 14 located near the handlebars of the bicycle. The friction wheel 11 is usually made of metal and is thus, corrodible. The conducting wire 13 is exposed to the elements and is susceptible to wire faults. Another disadvantage of the above described light device is that it cannot provide strong light output.

SUMMARY OF THE INVENTION

A first object of this invention is to provide a light device for a bicycle which is powered by the rotation of the front wheel of the bicycle and capable of generating a stronger light output.

A second object of this invention is to provide a light device for a bicycle which incorporates a speedometer assembly and an odometer.

Accordingly, the bicycle light device of this invention comprises a hollow main casing to be attached to a handlebar stem of the bicycle, a first magnet member, a second magnet member having a polarity opposite that of the first magnet member, a coil member disposed between the first and second magnet members, and a rotary magnet piece disposed adjacent to the first and second magnet members. The first and second magnet members, the coil member and the rotary magnet member are disposed inside the main casing. The rotary magnet member has a downwardly extending hollow post member projecting through the main casing.

A friction wheel is in contact with the rim edge of the front wheel of the bicycle and is rotated by the same. An elongated semi-flexible rod has one end connected to the friction wheel and another end extending and connected to the hollow post member of the rotary magnet piece.

A light casing is attached to a front open end of the main casing. A light bulb is disposed inside the light casing and is electrically connected to the coil member.

The rotation of the front wheel rotates the friction wheel, the elongated rod, and the rotary magnet piece. The rotation of the rotary magnet piece induces electric current in the coil member which powers the light bulb.

BRIEF DESCRIPTION OF THE DRAWINGS

Other features and advantages of this invention will become apparent in the following detailed description of the preferred embodiment with reference to the accompanying drawings, in which:

FIG. 2 is an exploded view of a first main casing of the first preferred embodiment and its contents;

FIG. 2A is a bottom view illustrating the assembly of the contents of the first main casing of FIG. 2;

DETAILED DESCRIPTION OF THE PREFERRED EMBODIMENTS

Figure 1:
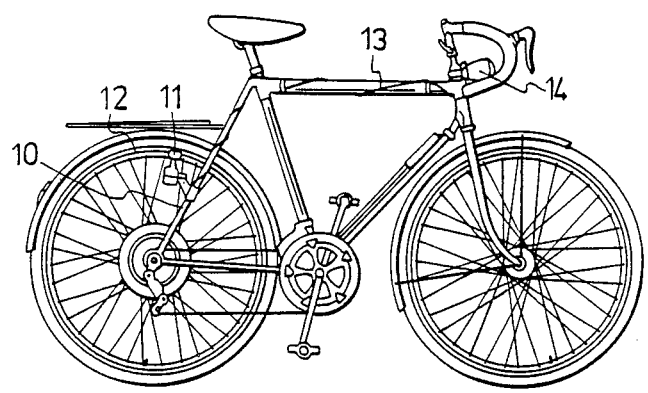
FIG. 1 is an illustration of a bicycle using a conventional light device.

Referring to FIG. 2, a first preferred embodiment of a bicycle light device according to this invention is shown to comprise a main casing 20, an electric current generator 30 and light means 40.

The main casing 20 comprises of upper and lower hollow casing parts 200 and 201. The lower casing part 201 is divided into a first and a second receiving space 21 and 22 partitioned by a transverse wall member 23. The wall member 23 has a pair of rectangular notches 230 and 231 formed in a top end. The lower casing part 201 has a rearwardly and downwardly inclining flange ear 24. The upper and lower casing parts 200 and 201 have a front open end A. The upper and lower casing parts 200 and 201 further have a mounting hole 25 near the front open end A.

The electric current generator 30 has a seat member 31 with a central recess 3101 and a hollow downwardly extending threaded pipe section 3102. The seat member 31 further has a pair of oppositely disposed axial notches 311 and 312 intercommunicated with the recess 3101. A tube member 33 is received in the pipe section 3102. A substantially rectangular plate member 34 has a pair of flange ears 341 received by the axial notches 311 and 312, and a circular hole 342 aligned with the tube member 33. A rotary magnet piece 35 has a downwardly extending hollow post member 350 extending into the tube member 33. A first substantially cross-shaped magnet member 36 is disposed on top of the rotary piece 35 and has a downwardly extending leg 360 projecting from each end of the first magnet member 36. A coil member 37 is disposed on top of the first magnet member 36 and comprises a coil drum 370, a conducting wire 371 wrapped around the coil drum 370, and a core 372 disposed at the center of the coil drum 370. A second substantially cross-shaped magnet member 38 is disposed on top of the coil member 37. A downwardly extending leg 380 similarly projects from each end of the second magnet member 38. The core 372 extends into openings 361 and 381 to retain the first and second magnet members 36 and 38. A hollow protective cover 32 acts as a shield for the second magnet member 38. The electric current generator 30 is disposed in the first receiving space 21 of the lower casing part 201. The pipe section 3102 extends through an opening 210 in the lower casing part 201.

A bottom view illustrating the assembly of the first and second magnet members 36 and 38 and the rotary piece 35 is shown in FIG. 2A. The rotary piece 35 is at the center. The legs 360 and 380 of the first and second magnet members 36 and 38 alternate with one another around the perimeter of the rotary piece 35. The legs 360 serve as the north magnetic poles while the legs 380 serve as the south magnetic poles of the electric current generator 30.

The light means 40 includes a light casing 41, a light bulb 42 disposed inside the light casing 41, and a pair of conducting pieces 43 and 44 connected to the terminals of the light bulb 42. The conducting pieces 43 and 44 are received in the rectangular notches 230 and 231 of the wall member 23 of the lower casing part 201. Once assembled, the upper and lower casing parts 200 and 201 form a hollow space C to receive the light casing 41. (Refer to FIG. 3). The light casing 41 is fixed to the upper and lower casing parts 200 and 201 by means of a pair of projections 410 formed on the upper and lower surfaces of the light casing 41 which are received in the mounting holes 25 of the upper and lower casing parts 200 and 201.

Figure 3:
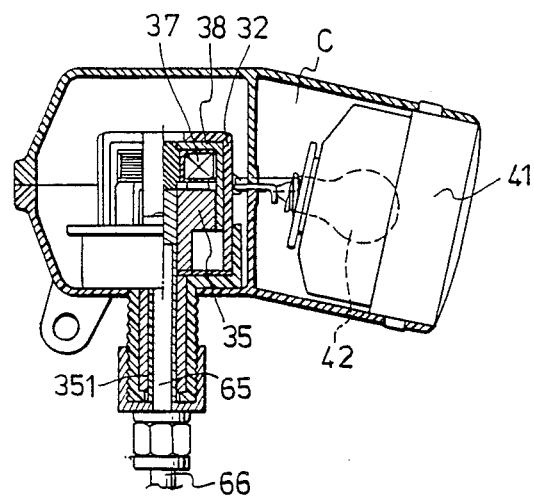
FIG. 3 is a sectional view illustrating assembly of the parts shown in FIG. 2.
Figure 4:
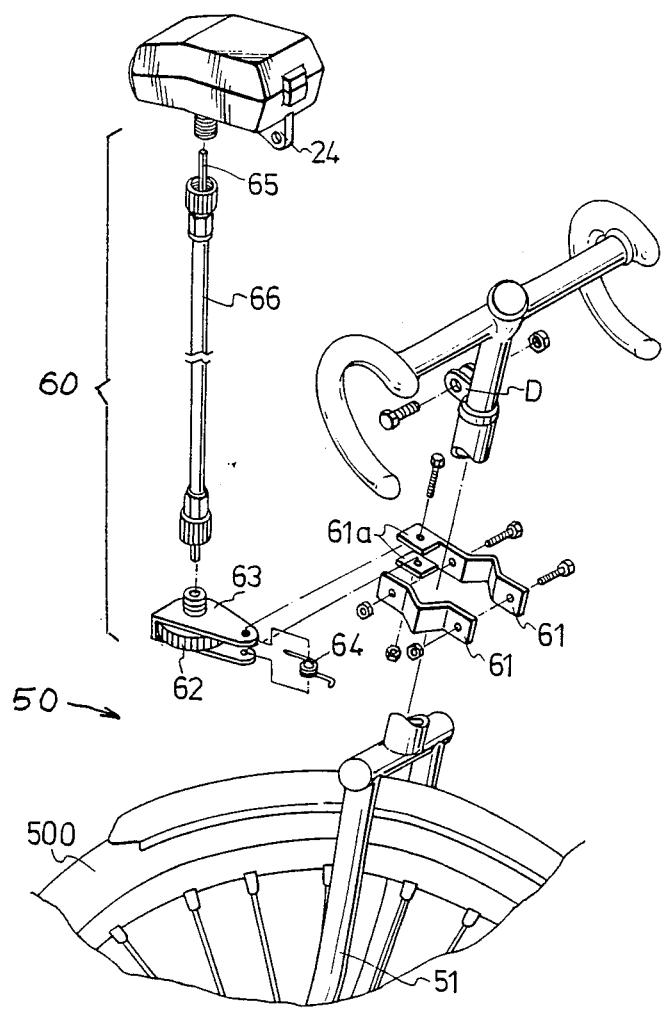
FIG. 4 is an exploded view of a rotating means of the bicycle light device according to this invention.

Referring to FIG. 4, the first preferred embodiment further comprises a rotary assembly 60 which is attached to one of the front forks 51 of the bicycle 50 adjacent to the front wheel 500. The rotary assembly 60 includes a pair of clamp plates 61 which grip the front fork 51. A friction wheel 62 engages the rim of the front wheel 500. The friction wheel 62 is rotatably disposed in a wheel frame 63 attached to one end 61a of one of the mounting pieces 61. A biasing means 64 urges the wheel frame 63 towards the front wheel 500. An elongated semi-flexible rod 65 is rotated by the friction wheel 62. The semi-flexible rod 65 is sheathed by a flexible tube 66. A top end of the semi-flexible rod 65 fits into the hollow space 351 of the rotary piece 35. The flange ear 24 is attached to a mounting unit D of the handlebar stem of the bicycle 50. Referring to FIGS. 2, 3 and 4, when the bicycle 50 begins to roll, the rotation of the front wheel 500 correspondingly rotates the friction wheel 62 and spins the semi-flexible rod 65. The rotary piece 35 then rotates with the semi-flexible rod 65. The rotation of the rotary piece 35 causes changes in the magnetic fields of the first and second magnet members 36 and 38, thus inducing current in the coil member 37. The two ends of the conducting wire 371 of the coil member 37 are connected to the conducting pieces 43 and 44, respectively. Electric current is thereby supplied to the bulb 42, causing it to light up.

The main casing 20 of the first preferred embodiment allows the bicycle light device to be used in inclement weather conditions without suffering damage. If more illumination is desired, the friction wheel 62 may be replaced with a similar article having a smaller diameter to increase the angular velocity of the semi-flexible rod 65, thus increasing the induced current.

It is also possible to incorporate a switching means in the first preferred embodiment between the conducting pieces 43 and 44. The switching means is used as a control means to prevent or allow current flow to the light bulb 42. The construction of such a switching means is known in the art and will not be discussed herein.

Figure 5:
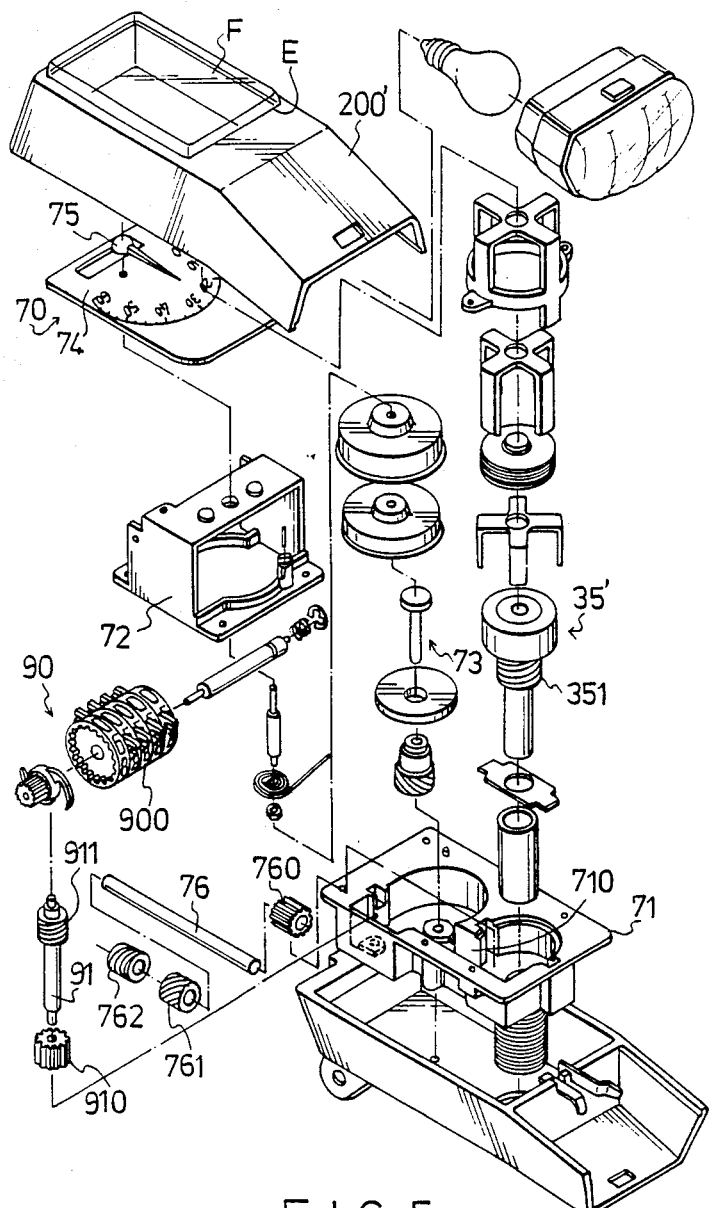
FIG. 5 illustrates a second main casing of the second preferred embodiment and its contents.

Referring to FIG. 5, a second preferred embodiment of a bicycle light device according to this invention is shown to comprise a speedometer assembly 70. (The structure of the speedometer assembly 70 is known to one skilled in the art and can be found in a conventional bicycle exerciser or in an ordinary motorcycle. Thus, a much detailed description of the speedometer assembly 70 and its operation will not be provided herein.)

The speedometer assembly 70 comprises an indicator scale 74, an indicator needle 75, and a seat member 71 substantially similar to the seat member 31 of the first preferred embodiment but having a much wider dimension. The seat member 71 receives a needle actuating means 73 enclosed by a hollow protective cover 72. The upper casing part 200' includes a window opening E with a transparent pane member F attached to the upper casing part 200' at the window opening E. This allows the user to see both the indicator scale 74 and the indicator needle 75 in order to receive information on the speed of the bicycle 50.

The seat member 71 has a groove 710 to receive an axle 76. Gear wheels 760, 761 and 762 are attached to the two ends of the axle 76. The rotary piece 35' has a toothed section 351 which meshes with the teeth of the gear wheel 760. The gear wheel 762 actuates an odometer 90. The structure and operation of the odometer 90 is also known to one skilled in the art and thus, would not be described in detail.

Figure 6:
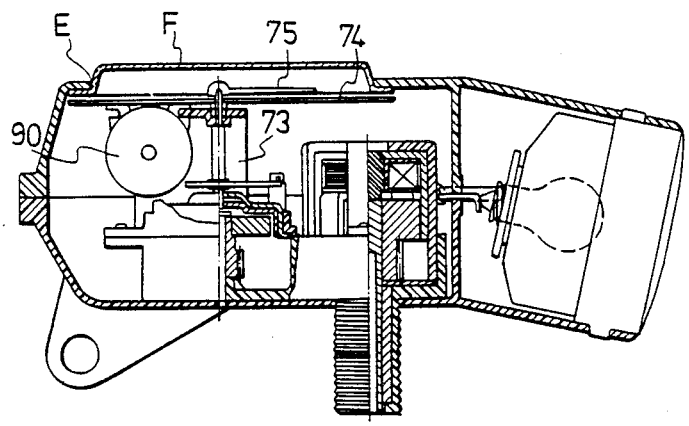
FIG. 6 is a sectional view illustrating assembly of the parts shown in FIG. 5.

The odometer 90 has a shaft 91 with a gear wheel 910 and 911 on each end. The gear wheel 762 meshes with the gear wheel 910 to rotate a counting disc mechanism 900 of the odometer 90. A sectional view of the assembled second preferred embodiment is shown in FIG. 6.

While the present invention has been described in connection with what is considered the most practical and preferred embodiments, it is understood that this invention is not limited to the disclosed embodiments, but is intended to cover various arrangements included within the spirit and scope of the broadest interpretation so as to encompass all such modifications and equivalent arrangements.

I claim:

1. A light device for a bicycle having a pair of front forks, a front wheel mounted between said front forks and a handlebar stem, comprising:

a hollow main casing to be attached to said handlebar stem, said hollow main casing having an open front end;

an electric current generating means disposed inside said hollow main casing, said electric current generating means including a first magnet member, a second magnet member having a polarity opposite said first magnet member, a coil member disposed between said first and said second magnet members, and a rotary magnet piece disposed adjacent said first and said second magnet members and having a downwardly extending hollow post member projecting through said hollow main casing;

means actuated by said front wheel for rotating said rotary magnet piece, said rotating means including a friction wheel in contact with the rim edge of said front wheel and being rotated by the same, a wheel frame for attaching said friction wheel to one of said front forks, an elongated semi-flexible rod having one end connected to said friction wheel and another end extending into and connected to said hollow post member of said rotary magnet piece, a flexible tube member to sheathe said elongated rod, and means for urging said wheel frame towards said front wheel, said rotary magnet piece rotating with said elongated rod; and a lighting means including a light casing attached to said hollow main casing at said front open end, and a bulb means disposed inside said light casing and electrically connected to said coil member;

whereby, the rotation of said front wheel correspondingly rotates said rotary magnet piece to induce electric current in said coil member, the induced electric current powering said bulb means.

2. The light device as claimed in claim 1, further comprising a speedometer assembly, said hollow main casing further having a transparent pane to allow viewing of said speedometer assembly.

3. The light device as claimed in claim 2, wherein said hollow post member of said rotary magnet piece has a toothed section, said light device further comprising an odometer actuated by said toothed section of said rotary magnet piece.

4. The light device as claimed in claim 1, wherein each of said first and said second magnet members is substantially cross-shaped, each of said first and said second magnet members having four ends and a downwardly extending leg projecting from each end, said downwardly extending legs of said first and said second magnet members being alternatingly arranged around the perimeter of said rotary magnet piece.

* * * * *